Figure 1:
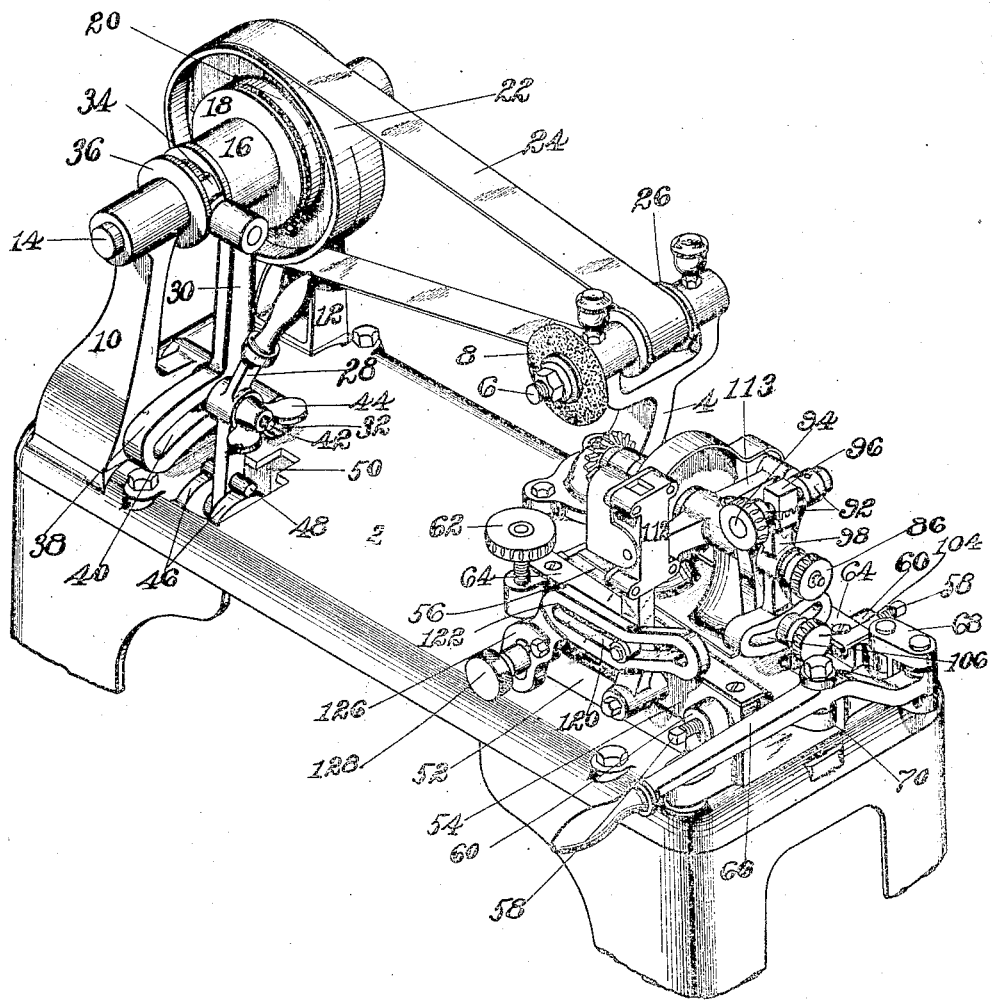

J. J. HEYS.
GRINDING MACHINE.
APPLICATION FILED JULY 26, 1913.

1,127,888.

Patented Feb. 9, 1915.
2 SHEETS—SHEET 1.

WITNESSES:
Elizabeth C. Coupe
Edith C. Holbrook

INVENTOR.
John J. Heys
By his Attorney,
Nelson W. Howard

UNITED STATES PATENT OFFICE.

JOHN J. HEYS, OF LYNN, MASSACHUSETTS, ASSIGNOR TO UNITED SHOE MACHINERY COMPANY, OF PATERSON, NEW JERSEY, A CORPORATION OF NEW JERSEY.

GRINDING-MACHINE.

1,127,888.

Specification of Letters Patent.

Patented Feb. 9, 1915.

Application filed July 26, 1913. Serial No. 781,282.

*To all whom it may concern:*

Be it known that I, JOHN J. HEYS, a citizen of the United States, residing at Lynn, in the county of Essex and State of Massachusetts, have invented certain Improvements in Grinding-Machines, of which the following description, in connection with the accompanying drawings, is a specification, like reference characters on the drawings indicating like parts in the several figures.

This invention relates to grinding machines, and particularly to machines for grinding the teeth of rotary cutters such as are used for trimming the edges of soles in the manufacture of boots and shoes.

Cutters used for this and similar purposes are circular in peripheral outline, and include a plurality of evenly spaced teeth, the ends of which are formed to present cutting edges that correspond to the desired transverse contour of the edge of the work, and each tooth is backed off at a slight angle to the direction of its motion in order to give the clearance necessary to enable the tooth to cut. If, in sharpening these cutters, the faces of some of the teeth are ground to a greater extent than others, it is obvious that the length of the teeth diametrically of the cutter will be caused to vary correspondingly and the true periphery of the cutter will not be maintained. Such variations frequently occur in practice, especially where the cutter is presented by hand to the grinding member or where the cutter is held in position for the grinding operation by resting one of its teeth upon a guide or positioning member. In the latter case it is obvious that any irregularities in the shape of the cutter such as may be caused by the warping of the wheel in hardening or an error in grinding, will necessarily be increased by repeated grindings. Cutters thus incorrectly ground tend to vibrate when in contact with the work and do not produce smooth edges.

It is the object of the present invention to provide a machine that will correct any inaccuracy in the shape of a cutter of the type specified and that will grind all the teeth to a uniform extent and on the same angle and maintain the teeth in correctly spaced relation.

To this end I have devised a machine that includes a grinding member and a cutter support, having provision for relative movement of the grinding member and support to effect alternate engagement and disengagement of the grinding member and cutter, with a novel arrangement of means for holding the cutter in correct angular relation to the grinding member and for effecting rotary movement of the cutter to bring the teeth successively into position to be ground. These and other features of the invention, including certain features of adjustment and other details of construction and combinations of parts, will be described with reference to an illustrative machine and pointed out in the appended claims.

Figure 2:
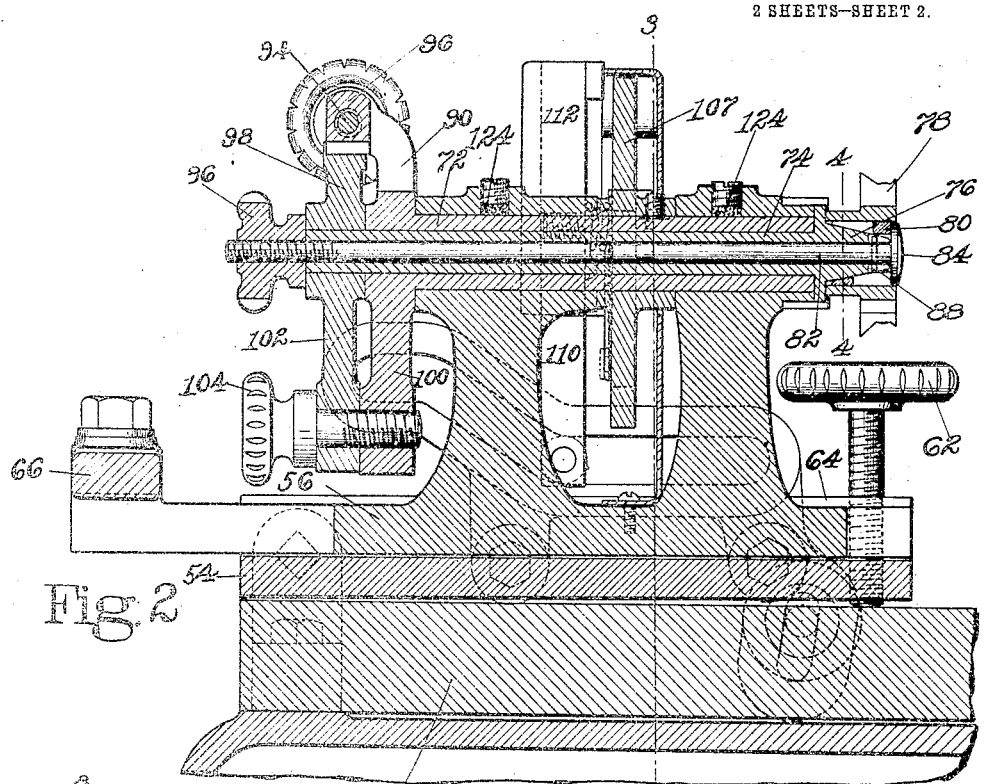
Figures 3, 4:
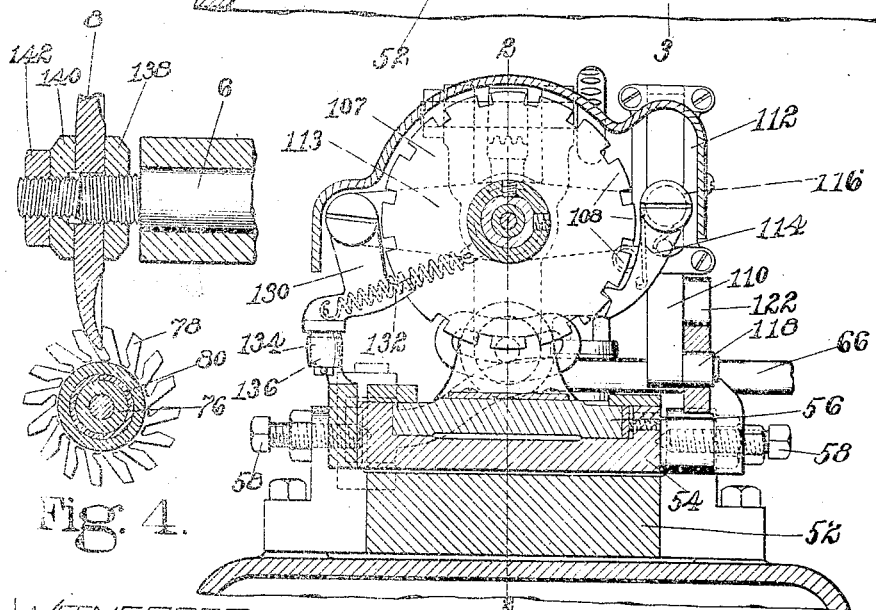

Referring now to the accompanying drawings which illustrate a preferred embodiment of the invention, Figure 1 is a perspective view of the machine; Fig. 2 is a vertical section longitudinally through a portion of the machine seen at the right of Fig. 1 and taken on the line 2—2 of Fig. 3; Fig. 3 is a section on the line 3—3 of Fig. 2; and Fig. 4 is a detail section through the grinding wheel, showing the wheel in operative relation to a cutter, the supporting elements for the latter being shown in section on line 4—4 of Fig. 2.

Supported by the base or frame 2 of the machine is a standard 4 which provides bearings for a shaft 6 that carries a grinding wheel 8. Supported also by the base 2 are standards 10 and 12 which are formed to provide bearings for a driving shaft 14, and loosely mounted on the latter and movable longitudinally with respect thereto is a pulley 16 which is to be driven by a belt, not shown, from a suitable source of power. Upon one side of this pulley is formed one member 18 of a friction clutch, the complementary member 20 of which is formed on one side of a pulley 22 splined on the shaft 14 and connected by a belt 24 with a pulley 26 on the grinder shaft 6. By this arrangement the members 18 and 20, when in engagement, serve to clutch the pulley 22 to the pulley 16 and effect the rotation of the grinding wheel, and when these members are disengaged the grinder will remain idle irrespective of rotation of the pulley 16.

For operating the clutch there is provided a hand member 28 which serves to effect movement of the bell crank 30 pivoted at 32 to the standard 10 and connected to move the pulley 16 longitudinally of its shaft by means of a member 34 positioned within a groove of a collar 36 secured to the pulley. The arm 38 of the bell crank is provided with an arc-shaped slot 40, in which engages a bolt 42 which passes through the member 28 and has a thumb nut 44 threaded upon its outer end. The member 28 is pivoted by means of a pin, not shown, that engages upwardly in half bearings beneath the frame 2. Curved guides 46 are engaged by a pin 48 also carried by the member 28 and thereby serve to retain the latter in position. A slot 50 formed in the frame 2 permits the member 28 to be inserted or removed as desired.

It will be understood that movement of the member 28 will cause the bolt 42 to slide to different positions in the slot 40 and thereby move the bell crank so as to effect longitudinal movement of the pulley 16 and the clutch member 18 with respect to the shaft 14 and set or release the clutch. By means of the thumb nut 44, the member 28 may, if desired, be clamped to the member 38 so as to hold the clutch securely in any position of adjustment.

Secured upon the frame 2 is a base 52 upon which is mounted adjustably a supporting member 54 for a movable cutter supporting and carrying member 56. The member 54 is mounted near one end upon pivots 58 that are threaded through lugs 60 on the base 52. Threaded through the supporting member near the other end is an adjustable screw 62 that bears upon the base 52 and serves to adjust the member 54 so as to vary the position of the cutter with reference to the grinding wheel as will be subsequently explained. The support 56 is slidably mounted on the member 54 and is held thereon by detachable plates 64 that project over the edges of the lower portion of the support. The support 56 is slidable in the guideways thus provided through the movement of a hand-lever 66 that is pivoted on links 68 which are pivoted in turn to the member 52, and is pivotally connected to a projection on the end of the support at 70.

The cutter support 56 is provided with bearings in which is mounted rotatably a sleeve 72, and mounted within the sleeve and rotatable with respect thereto is a spindle 74. This spindle is provided at one end with a conical portion 76 upon which the cutter 78 is to be mounted and secured by means of an expansion bushing 80. A rod 82 passes longitudinally through the spindle and is provided with a head 84 that engages the bushing and serves, when the rod is moved longitudinally by means of a nut 86 threaded upon the end thereof and engaging the end of the spindle 74, to expand the bushing and hold the cutter securely in position. A pin 88 in the rod engages in a slot in the end of the conical member and prevents relative rotation of the rod and spindle.

Formed integral with the sleeve 72 is a projecting arm 90 which is forked and curved toward one side to provide alined journal bearings 92 for a spindle 94, the intermediate portion of which is threaded and carries a correspondingly threaded block 96 with teeth formed upon one side thereof. Secured upon the end of the spindle 74 is an arm 98, the end of which is formed with teeth that intermesh with the teeth on the block 96. It will be seen that, with this construction, rotation of the spindle 94 serves to move the block 96 longitudinally thereof and thereby to effect relative angular adjustment of the arms 90 and 98 and consequently to adjust the relative angular positions of the sleeve 72 and the spindle 74. The arms 90 and 98 are provided respectively with extensions 100 and 102, in the former of which is threaded a clamping screw 104, the shank of which is embraced by an arc-shaped slotted portion 106 of the other extension. With this arrangement, tightening of the screw 104 will serve to secure the arms together in adjusted position.

Secured upon the sleeve member 72 is a feed member 107 comprising a wheel provided with a peripheral series of teeth 108 corresponding in number to the teeth on the cutter to be ground. For advancing the cutter so as to grind the teeth successively I have provided means for engaging the feed wheel 107 and moving the wheel and the cutter the required distance at each reciprocation of the supporting member 56. This means comprises a slide 110 which is mounted to reciprocate vertically in the casing 112 carried by a horizontal arm 113 on the support and a pawl 114 pivoted on the slide with a spring 116 to urge the pawl into engagement with the teeth of the feed or ratchet wheel. Movement of the slide through movement of the support 56 is effected by engagement of a roller 118 on the slide with the sides of a cam slot 120 formed in a plate 122 secured on one side of the supporting member 54. The arrangement is such that when the support 56 is moved in a direction to withdraw the cutter from contact with the grinding wheel the slide is moved upwardly and the pawl turns the feed wheel and cutter the required distance to bring the next tooth into position to be ground. When the support is moved in the opposite direction, the slide is moved downwardly and the pawl is brought into engagement with the next tooth of the feed wheel. During this movement of the support toward the grinding wheel the cutter carrying members are held from angular displacement by means of friction devices 124, each of which consists of a piece of felt or some similar substance held by a screw as shown in frictional engagement with the outer surface of the sleeve 72.

Additional means are provided for keeping the cutter in position while a tooth is being ground, consisting of a detent 130 pivoted on the arm 113 and held by a spring 132 in engagement between adjacent teeth of the feed wheel to keep the wheel from turning. The detent carries a roller 134, and a cam member 136 secured at one side of the support 54 acts upon the roller when the supporting member 56 is moved away from the grinding wheel so as to withdraw the detent from engagement with the wheel when the pawl 114 is acting to advance the feed wheel and the cutter. Obviously the detent will be likewise withdrawn when the support is moved in the opposite direction, but the friction devices 124 are depended upon at this time to keep the feed wheel from turning until the detent is again permitted to engage between the teeth of the wheel.

The plate 122 is provided with a downward projection 126 having a slot formed therein, and a clamping screw 128 passes through the slot and is threaded into the member 52. When this screw is tightened it serves to hold the supporting member 54 in any position to which it is adjusted by means of the screw 62.

The grinding wheel 8 is held adjustably upon its shaft by means of nuts 138 and 140 which engage oppositely threaded portions of the shaft, the nut 140 being threaded upon a reduced portion of the shaft and held thereon by means of a nut 142. By this means the wheel may be adjusted longitudinally of the shaft 6 when desired.

The operation of the machine may be briefly described as follows: The cutter is first placed in any desired position upon the end of the spindle 74 and by means of the nut 86 the rod 82 is moved longitudinally so as to expand the bushing 80 and hold the cutter securely in position. With the grinding wheel idle the support 56 is then moved forwardly by means of the lever 66 so as to bring the cutter into operative relation to the wheel with the latter projecting between adjacent teeth of the cutter. With the screw 104 loosened the screw threaded spindle 94 is then manipulated so that the face of the tooth to be ground shall be brought into correct relation to the face of the grinding wheel with the detent 130 engaging between adjacent teeth of the feed wheel. If necessary, the grinding wheel may be adjusted longitudinally of its shaft in order that the wheel and the cutter may be positioned in correct operative relation. The parts having been adjusted in this manner, the screw 104 is tightened so as to hold the feed wheel and the cutter in the correct angular relation and assure that the two shall be rotated in unison. If necessary also the screw 62 may be manipulated so as to adjust the forward end of the supporting base 54 to suit the radial depth of the teeth or the diameter of the cutter to be ground, and the screw 128 may be tightened to hold the support in the proper position. The clutch is now operated so as to start the rotation of the grinding wheel, and the supporting member 56 is moved backwardly and forwardly by means of the lever 66, the cutter being advanced at each backward movement of the support in the manner already explained so as to bring a succeeding tooth into position to be ground on a subsequent forward movement of the support. The detent 130 serves to hold the cutter firmly in the correct angular relation at all times when the cutter is in position to engage with the grinding wheel.

It should be understood that the machine embodying this invention is not limited to use in grinding edge trimming cutters for shoe soles, but that it is equally adapted for grinding cutters of similar construction that are used for various other purposes. It should also be understood that although I have disclosed the invention as embodied in a machine having the specific features of construction shown and described, the invention is not thus restricted in its application, but various other embodiments are comprehended within the spirit and scope of the claims.

Having described the invention, what I claim as new and desire to secure by Letters Patent of the United States is the following:

1. A machine of the class described having, in combination, a grinding member, a support for a cutter, said support being movable to carry the cutter into and out of operative relation to the grinding member and having provision for mounting the cutter rotatably thereon, a feed member connected to move in unison with the rotary movement of the cutter, and operating means for the feed member also carried by said support and movable relatively thereto in a direction to effect rotation of the cutter during movement of the support in a direction away from the grinding member.

2. A machine of the class described having, in combination, a grinding member, a support for a cutter, said support being movable to carry the cutter into and out of operative relation to the grinding member and having provision for mounting the cutter rotatably thereon, a feed member carried by the support and connected to move in unison with the rotary movement of the cutter, means carried by said support and movable relatively thereto for operating said feed member to effect rotation of the cutter, and means for imparting movement to said operating means to turn the cutter a predetermined distance on a movement of said support in a direction to withdraw the cutter from operative relation to the grinding member.

3. A machine of the class described having, in combination, a grinding member, a support for a cutter, said support being mounted for substantially rectilinear movement to carry the cutter into and out of operative relation to the grinding member and having provision for mounting the cutter rotatably thereon, a pawl and ratchet device carried by said support and arranged to impart rotative movement to the cutter, and cam means for imparting movement to said device to turn the cutter a predetermined distance on a movement of said support.

4. A machine of the class described having, in combination, a grinding member, a support for a cutter, said support being movable to carry the cutter into and out of operative relation to the grinding member and having provision for mounting the cutter rotatably thereon, a toothed feed wheel carried by the support and connected to rotate with the cutter, a slide movably mounted on the support, a pawl carried by said slide and arranged to engage the teeth of the feed wheel and operate the latter on a movement of the slide, and cam means for operating said slide to effect rotation of the feed wheel and cutter on a movement of said support.

5. A machine of the class described having, in combination, a grinding member, a support for a cutter, said support being movable to carry the cutter into and out of operative relation to the grinding member and having provision for mounting the cutter rotatably thereon, a feed member connected to rotate with the cutter, operating means for the feed member also carried by the support and arranged for reciprocatory movement with reference thereto, positive means for imparting movement in both directions to said operating means, and means arranged to engage said feed member to prevent rotation thereof when the cutter is in operative relation to the grinding member.

6. A machine of the class described having, in combination a grinding member, a support for a cutter, said support being movable to carry the cutter into and out of operative relation to the grinding member and having provision for mounting the cutter rotatably thereon, a toothed feed wheel carried by the support and connected to rotate with the cutter, operating means carried by the support and movable relatively thereto for engaging the teeth of the feed wheel to turn said wheel and the cutter positive means for imparting movement to said operating means to turn the feed wheel and cutter a predetermined distance on a movement of said support in one direction and for imparting a reverse movement to said operating means on a movement of the support in the opposite direction, and means for engaging the teeth of the feed wheel to prevent rotation of said wheel when cutter is in operative relation to the grinding member.

7. A machine of the class described having, in combination, a grinding member, a support for a cutter, said support being movable to carry the cutter into and out of operative relation to the grinding member and having provision for mounting the cutter rotatably thereon, a feed wheel connected to rotate with the cutter and formed with a peripheral series of teeth, means for engaging said teeth and turning the feed wheel and cutter a predetermined distance on a movement of said support in a direction away from the grinding member, and means arranged to engage said teeth to prevent rotation of the feed wheel while the cutter is in operative relation to the grinding member.

8. In a machine of the class described, the combination with a grinding member, of a support for a toothed cutter, said support including a rotatable holder with provision for securing the cutter thereon, feeding means for imparting to the holder intermittent rotary movement to bring the teeth of the cutter successively into position to be ground, said means including a feed member connected to move in unison with the rotary movement of the cutter, said holder and feed being relatively adjustable, and means for maintaining said holder and feed member in a predetermined relation of adjustment during the grinding of the teeth of the cutter.

9. In a machine of the class described, the combination with a grinding member, of a support for a toothed cutter, said support including a rotatable holder with provision for securing the cutter thereon, feeding means for imparting to the holder intermittent rotary movement and including a feed member mounted concentrically with the holder and normally rotatable therewith, and manually operated means for effecting initially relative angular adjustment of said holder and feed member to cause the feed member to sustain a predetermined adjusted relation to the cutter during the grinding operation.

10. In a machine of the class described, the combination with a grinding member, of a support for a toothed cutter, said support including a rotatably mounted spindle with means for securing the cutter thereon, feeding means for imparting to said spindle intermittent rotary movement and including a feed member mounted concentrically with said spindle and rotatable thereon or therewith, said spindle and feed member being relatively adjustable through relative rotation thereof, and means for securing said spindle and feed member together in adjusted position so as to prevent relative rotation thereof during the grinding of the teeth of the cutter.

11. In a machine of the class described, the combination with a grinding member, of a support for a toothed cutter, said support including a rotatable holder with provision for securing the cutter thereon, feeding means for imparting to the holder intermittent rotary movement and including a feed member mounted concentrically with the holder and normally rotatable therewith, said holder and feed member each having an arm connected therewith, means for effecting relative angular adjustment of said arms to position relatively the feed member and the holder, and means for securing said holder and member together in adjusted position.

12. In a machine of the class described, the combination with a grinding member, of a support for a toothed cutter, said support including a rotatably mounted spindle with means for securing the cutter thereon, feeding means for imparting to said spindle intermittent rotary movement to bring the teeth of the cutter successively into position to be ground, said means including a sleeve rotatably mounted on said spindle and a feed member secured to said sleeve, said spindle and sleeve each having an arm projecting therefrom, and means for effecting relative angular adjustment of said arms to position relatively the feed member and the cutter.

13. In a machine of the class described, the combination with a grinding member, of a support for a toothed cutter, said support including concentric rotatable elements, one of said elements having provision for securing the cutter thereon, feeding means for imparting intermittent rotary movement to the cutter and including a feed member secured upon said other rotatable element, each of said rotatable elements having an arm projecting therefrom, means for securing said arms together to effect rotation of the cutter by movement of said feed member, and means for effecting initially relative-angular adjustment of said arms to position relatively the feed member and the cutter.

14. In a machine of the class described, the combination with a grinding member, of a support for a toothed cutter, said support including concentric rotatable elements, one of said elements having provision for securing the cutter thereon, feeding means for imparting intermittent rotary movement to the cutter and including a feed member secured upon said other rotatable element, each of said rotatable elements having an arm projecting therefrom, said elements being arranged to rotate in unison to effect rotation of the cutter by movement of said feed member, and means for effecting initially relative angular adjustment of said arms to position relatively the feed member and the cutter comprising a screw-threaded spindle journaled in one of said arms and having means longitudinally movable upon the threaded portion thereof and in engagement with the other arm.

15. A machine of the class described having, in combination, a grinding member, a support for a cutter, said support being movable to carry the cutter into and out of operative relation to the grinding member, a base upon which said support is mounted, said base being adjustably connected with the frame of the machine to vary the path of movement of the support with reference to the grinding member, a screw threaded through said base and engaging a fixed portion of the machine for effecting said adjustment of the base, and means for securing said base in adjusted position.

In testimony whereof I have signed my name to this specification in the presence of two subscribing witnesses.

JOHN J. HEYS.

Witnesses:
 HOWARD H. G. PERKINS,
 CHESTER E. ROGERS.

It is hereby certified that in Letters Patent No. 1,127,888, granted February 9, 1915, upon the application of John J. Heys, of Lynn, Massachusetts, for an improvement in "Grinding-Machines," errors appear in the printed specification requiring correction as follows: Page 4, line 65, after the word "cutter" insert a comma; same page, line 105, after the word "feed" insert the word *member;* and that the said Letters Patent should be read with these corrections therein that the same may conform to the record of the case in the Patent Office.

Signed and sealed this 8th day of June, A. D., 1915.

[SEAL.]                                      R. F. WHITEHEAD,

*Acting Commissioner of Patents.*